(12) United States Patent
Kirkeby et al.

(10) Patent No.: US 11,397,804 B2
(45) Date of Patent: Jul. 26, 2022

(54) SYSTEM AND METHODS FOR AUTHENTICATING TANGIBLE PRODUCTS

(71) Applicants: Cynthia Fascenelli Kirkeby, Orange, CA (US); Anthony Suk Ko, Yorba Linda, CA (US)

(72) Inventors: Cynthia Fascenelli Kirkeby, Orange, CA (US); Anthony Suk Ko, Yorba Linda, CA (US)

( * ) Notice: Subject to any disclaimer, the term of this patent is extended or adjusted under 35 U.S.C. 154(b) by 0 days.

(21) Appl. No.: 17/283,156

(22) PCT Filed: Oct. 9, 2019

(86) PCT No.: PCT/US2019/055425
§ 371 (c)(1),
(2) Date: Apr. 6, 2021

(87) PCT Pub. No.: WO2020/076968
PCT Pub. Date: Apr. 16, 2020

(65) Prior Publication Data
US 2021/0312033 A1 Oct. 7, 2021

Related U.S. Application Data (60) Provisional application No. 62/744,644, filed on Oct. 12, 2018.

(51) Int. Cl.
*G06F 21/44* (2013.01)
*G06Q 30/00* (2012.01)
*H04L 9/32* (2006.01)

(52) U.S. Cl.
CPC ........... *G06F 21/44* (2013.01); *G06Q 30/018* (2013.01); *H04L 9/3247* (2013.01)

(58) Field of Classification Search
CPC .............................. G06F 21/44; H04L 9/3247
See application file for complete search history.

(56) References Cited

U.S. PATENT DOCUMENTS

| 7,532,122 B2 | 5/2009 | Aull et al. |
| 7,602,291 B2 | 10/2009 | Tseng et al. |

(Continued)

*Primary Examiner* — Jeffrey D. Popham
(74) *Attorney, Agent, or Firm* — Master Key IP, LLP; Justin G. Sanders (57) ABSTRACT

A system and associated methods for authenticating an at least one tangible product are disclosed. In at least one embodiment, upon a user desiring to authenticate a given product via a user application on a user device, an authentication request is initiated with an authentication device attached to the product. A device variable count on the authentication device is incremented based on an underlying algorithm, and the authentication device generates a data set containing at least one of a unique device identifier, a unique device key and the device variable count. The authentication device provides the data set and the device identifier to the user application, which then transmits the data to an authentication server. If the authentication server locates the device identifier in an authentication table, and subsequently processes the data set successfully, the authentication server obtains from the authentication table a server variable count associated with the device identifier. If the device variable count is greater than the server variable count, the authentication server transmits a success message to the user application and sets the server variable count to be equal to the device variable count.

19 Claims, 3 Drawing Sheets

(56) References Cited

U.S. PATENT DOCUMENTS

| | | |
|---|---|---|
| 7,750,793 B2 | 7/2010 | Juels |
| 7,941,832 B2 | 5/2011 | Tsutsui et al. |
| 8,078,875 B2 | 12/2011 | Cowburn et al. |
| 8,154,405 B2 | 4/2012 | Gravelle et al. |
| 8,212,651 B2 | 7/2012 | Bauchot et al. |
| 8,458,474 B2 | 6/2013 | Robshaw et al. |
| 8,683,210 B2 | 3/2014 | Devadas |
| 8,896,420 B2 | 11/2014 | Chang et al. |
| 8,917,165 B2 | 12/2014 | Marques et al. |
| 8,938,615 B2 | 1/2015 | Neill et al. |
| 9,213,871 B1 | 12/2015 | Diorio et al. |
| 9,231,947 B2 | 1/2016 | Fairbanks et al. |
| 9,489,785 B2 | 11/2016 | Klammer et al. |
| 9,501,675 B1 | 11/2016 | Diorio et al. |
| 9,946,903 B2 | 4/2018 | Kozlov |
| 2002/0005774 A1 | 1/2002 | Rudolph et al. |
| 2006/0294583 A1 | 12/2006 | Cowburn et al. |
| 2007/0194879 A1 | 8/2007 | Backes et al. |
| 2008/0040276 A1* | 2/2008 | Hammad ............... G06Q 20/20 705/44 |
| 2008/0098469 A1 | 4/2008 | Morijiri et al. |
| 2008/0120236 A1* | 5/2008 | Faith ..................... G06Q 30/04 705/44 |
| 2009/0096574 A1 | 4/2009 | Oberle |
| 2010/0001840 A1 | 1/2010 | Kang et al. |
| 2010/0079243 A1 | 4/2010 | Hamada |
| 2010/0150348 A1 | 6/2010 | Fairbanks et al. |
| 2011/0153512 A1 | 6/2011 | Peckover |
| 2011/0291803 A1 | 12/2011 | Bajic et al. |
| 2013/0124854 A1 | 5/2013 | Kato et al. |
| 2014/0008429 A1 | 1/2014 | Wang et al. |
| 2014/0359746 A1 | 12/2014 | Tezuka et al. |
| 2015/0002260 A1 | 1/2015 | Brown |
| 2016/0110571 A1 | 4/2016 | Jung et al. |
| 2016/0358186 A1* | 12/2016 | Radocchia ....... G06K 19/07798 |
| 2017/0032285 A1 | 2/2017 | Sharma et al. |
| 2018/0343123 A1* | 11/2018 | Liu ..................... H04L 9/3271 |
| 2019/0026456 A1* | 1/2019 | Hon ..................... H04L 63/102 |

* cited by examiner

| AUTHENTICATION TABLE | | | | |
|---|---|---|---|---|
| DEVICE IDENTIFIER | SERVER COUNT | SERVER VARIABLE COUNT | DEVICE KEY | PRODUCT DETAILS |
| 123456789 | 5 | ... | ... | ... |
| 653987554 | 15 | ... | ... | ... |
| 774256932 | 12 | ... | ... | ... |

SYSTEM AND METHODS FOR AUTHENTICATING TANGIBLE PRODUCTS

RELATED APPLICATIONS

This application is a 35 U.S.C. 371 US national stage entry and is entitled to the earliest effective filing date of international application number PCT/US2019/055425, filed on Oct. 9, 2019, which itself claims priority U.S. provisional application Ser. No. 62/744,644, filed on Oct. 12, 2018. The contents of the aforementioned applications are incorporated herein by reference.

BACKGROUND

The subject of this patent application relates generally to authentication systems, and more particularly to a system and associated methods for authenticating tangible products.

Applicant(s) hereby incorporate herein by reference any and all patents and published patent applications cited or referred to in this application.

By way of background, the creation of counterfeit tangible products, from technology to consumer goods, is a massive problem that injures our economy, causes the loss of jobs, damages company reputations, and in some cases may even cause injury or death to the public. According to the U.S. Department of Homeland Security, in 2017 the intellectual property rights ("IPR") seizures of confiscated counterfeit goods in the U.S. added up to a total estimated manufacturer's suggested retail price ("MSRP") of approximately $1.2 trillion. As such device and system to authenticate and verify the brand origin of tangible products is critically needed to protect company assets and reputations, as well as consumer finances and health.

Counterfeit tangible products are often the cause of product failure in many industries, especially those with technology or engineered components, such as the automotive industry. As already noted, these inferior counterfeit products may expose a manufacturer to liability for damage or injuries to the public due to unauthorized component integration by third parties with mistaken attribution to the original manufacturer.

Current methods of counterfeit prevention for tangible products include: holograms, stickers, watermarks, adhesive seals, and other special identifying markers that are, unfortunately, easily bypassed by counterfeiters. Other authentication methods such as one-time passwords, and challenge-response protocols are commonly used for online user authentication. The ability to duplicate an identifying marker, barcode or other authentication code when a system is cracked or compromised, allows counterfeiters to duplicate hundreds or thousands of instances of a specific brand model, severely impacting the legitimate brand entity's ability to profit from its intellectual property.

The general public also typically lacks the expertise to separate fake identifying markers from genuine ones, even if the fake markers are poorly made. This has spawned the creation of product authentication experts and platforms which attempt to identify and certify products by detailed examination of the goods. Well counterfeited goods, however, can defeat these attempts. A robust solution for the problem of mass counterfeiting is desperately needed. Static countermeasures, like holograms and stickers, and existing electronic systems and human identification experts, are not sufficient protection against sophisticated counterfeiters.

Near-field communication ("NFC") devices that generate unique one-time codes for authentication currently exist; however they are primarily used in business-to-business ("B2B") applications. These NFC tags can also be activated and read by any nearby enabled NFC reader, leading to potential privacy issues.

Thus, a new system and associated methods for authenticating tangible products, where the identity of the item's brand entity and ancillary information is authenticated through a device integrated or attached to the tangle product, is desired.

Aspects of the present invention fulfill these needs and provide further related advantages as described in the following summary.

It should be noted that the above background description includes information that may be useful in understanding aspects of the present invention. It is not an admission that any of the information provided herein is prior art or relevant to the presently claimed invention, or that any publication specifically or implicitly referenced is prior art.

SUMMARY

Aspects of the present invention teach certain benefits in construction and use which give rise to the exemplary advantages described below.

The present invention solves the problems described above by providing a product authentication system and associated methods of use. In at least one embodiment, upon a user desiring to authenticate a given product via a user application on a user device in the user's possession or control, an authentication request is initiated with an authentication device attached to the product. A device variable count on the authentication device is incremented based on an algorithm that is unique to at least one of the corresponding product, a manufacturer of the corresponding product, or a model of the corresponding product, and the authentication device generates a data set containing at least one of a unique device identifier, a unique device key, and the device variable count. The authentication device provides the data set and the device identifier to the user application. The user application transmits the data set and the device identifier to an authentication server, which maintains an at least one authentication table containing select data associated with the at least one product and associated authentication device. If the authentication server determines that the transmitted device identifier does not match any of the at least one device identifier stored in the at least one authentication table, the authentication server transmits an error message to the user application. Otherwise, if the authentication server locates the transmitted device identifier in the at least one authentication table, the authentication server obtains from the authentication table the device key associated with the transmitted device identifier and attempts to process the data set. If processing the data set is successful, the authentication server obtains from the authentication table a server variable count associated with the transmitted device identifier, and compares the server variable count with the device variable count. If the device variable count is less than or equal to the server variable count, the authentication server transmits an error message to the user application. Otherwise, the authentication server transmits a success message to the user application, indicating that the authentication of said product has succeeded. The authentication server also sets the server variable count to be equal to the device variable count.

Other features and advantages of aspects of the present invention will become apparent from the following more detailed description, taken in conjunction with the accompanying drawings, which illustrate, by way of example, the principles of aspects of the invention.

BRIEF DESCRIPTION OF THE DRAWINGS

The accompanying drawings illustrate aspects of the present invention. In such drawings.

The above described drawing figures illustrate aspects of the invention in at least one of its exemplary embodiments, which are further defined in detail in the following description. Features, elements, and aspects of the invention that are referenced by the same numerals in different figures represent the same, equivalent, or similar features, elements, or aspects, in accordance with one or more embodiments.

DETAILED DESCRIPTION

Figure 1:
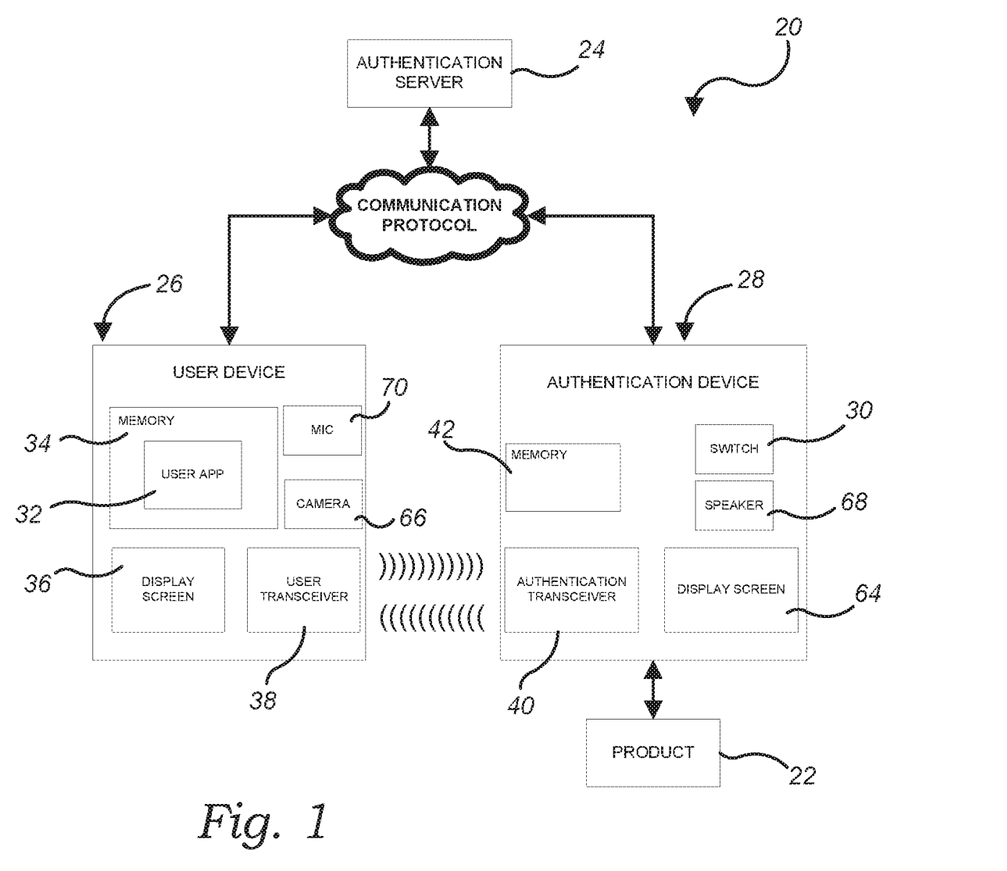
FIG. 1 is a simplified schematic view of an exemplary product authentication system, in accordance with at least one embodiment.

Turning now to FIG. 1, there is shown a simplified schematic view of an exemplary product authentication system 20 for authenticating an at least one tangible product 22. In at least one embodiment, the system 20 provides a central authentication server 24, an at least one user device 26 associated with an at least one user, and an at least one authentication device 28 associated with the at least one product 22. As discussed further below, in at least one embodiment, the authentication server 24 is in selective communication with the at least one user device 26, with the authentication server 24 being configured for receiving and processing data related to the at least one product 22. In at least one alternate embodiment, the authentication server 24 is omitted, such that the system 20 and associated methods described herein are implemented solely through the at least one user device 26 and the at least one authentication device 28—thus, any methods or functionality described herein as being carried out by the authentication server 24 may, in at least one embodiment, also be carried out by the at least one user device 26 and/or the at least one authentication device 28, regardless of whether such embodiments nevertheless incorporate the authentication server 24.

At the outset, it should be noted that communication between each of the authentication server 24, at least one user device 26, and at least one authentication device 28 may be achieved using any wired- or wireless-based communication protocol (or combination of protocols) now known or later developed. As such, the present invention should not be read as being limited to any one particular type of communication protocol, even though certain exemplary protocols may be mentioned herein for illustrative purposes, such as the Internet or a local area network for example. Similarly, in at least one embodiment, communications between each of the authentication server 24, at least one user device 26, and at least one authentication device 28 may be encrypted using any encryption method (or combination of methods) now known or later developed. It should also be noted that the term "user device" is intended to include any type of computing or electronic device now known or later developed—such as desktop computers, mobile phones, smartphones, laptop computers, tablet computers, personal data assistants, gaming devices, wearable devices, etc.—capable of substantially carrying out the functionality described herein. As such, the present invention should not be read as being limited to use with any one particular type of computing or electronic device, even though certain exemplary devices may be mentioned or shown herein for illustrative purposes. It should also be noted that, in at least one embodiment, the term "product" is intended to generally include any type of tangible object, now known or later developed, that might be purchased by the at least one user.

With continued reference to FIG. 1, in the exemplary embodiment, each of the authentication server 24, at least one user device 26, and at least one authentication device 28 contains the hardware and software necessary to carry out the exemplary methods for authenticating the at least one product 22, as described herein. Furthermore, in at least one embodiment, the authentication server 24 comprises a plurality of computing devices selectively working in concert with one another to carry out the exemplary methods for authenticating the at least one product 22, as described herein. In at least one embodiment, the at least one user device 26 provides a user application 32, system software or some other software residing on the user device 26 (hereinafter generally referred to as "user application" for simplicity purposes) residing locally in memory 34 on the user device 26, the user application 32 being configured for selectively communicating with at least one of the authentication server 24 and the at least one authentication device 28, as discussed further below. Accordingly, then, in at least one embodiment, the at least one user device 26 is in the possession of a user who is desirous of verifying the authenticity of the at least one product 22—i.e., confirming that the product 22 is genuine and originated from the true manufacturer of origin.

In at least one embodiment, the at least one authentication device 28 is attached to or otherwise associated with one of the at least one product 22. In other words, in at least one embodiment, the system 20 utilizes a one-to-one relationship between authentication devices 28 and products 22 (i.e., a separate authentication device 28 for each individual product 22). Thus, in at least one embodiment, the at least one authentication device 28 is physically attached or otherwise affixed to the corresponding product 22 in any form or method now known or later developed. For example, where a given product 22 is a retail item, such as a handbag, the corresponding authentication device 28 may be physically embedded within, or otherwise integrated with, the corresponding product 22. In at least one further example, the authentication device 28 may be incorporated into a hang tag or packaging. For simplicity purposes, the term "attach" (or "attached") is used herein to describe these various physical connections between the authentication device 28 and the corresponding product 22. Typically, a given authentication device 28 is attached to the corresponding product 22 by the manufacturer of said product 22; however, in some cases, other individuals or entities—such as vendors, distributors, sales personnel, retail management, wholesale management or even consumers—may attach the authentication device 28 (especially since any or all of these individuals or entities can benefit from using the system 20).

In at least one embodiment, the various components of the at least one user device 26 may reside on a single computing and/or electronic device, or may separately reside on two or more computing and/or electronic devices in communication with one another. In at least one embodiment, the functionality provided by the user application 32 resides remotely in memory on the authentication server 24, with each user device 26 capable of accessing said functionality via an online portal hosted by the authentication server 24, either in addition to or in lieu of the user application 32 residing locally in memory 34 on the at least one user device 26. It should be noted that, for simplicity purposes, the functionality provided by the user application 32 will be described herein as such—even though certain embodiments may provide said functionality through an online portal, or through other means on the user device 26. Accordingly, it should also be noted that, for simplicity purposes, when discussing functionality and the various methods that may be carried out by the system 20 herein, the terms "user device" and "user application" are intended to be interchangeable, given that the various methods may be carried out by the user application 32 in at least one embodiment, and by the user device 26 via means other than the user application 32 in at least one alternate embodiment.

With continued reference to FIG. 1, in at least one embodiment, the at least one user device 26 provides an at least one display screen 36 for providing an at least one graphical user interface to assist the associated user in possession of said user device 26 to utilize the various functions provided by the system 20. In at least one alternate embodiment, the at least one user device 26 provides at least one of a speaker, a braille reader, or another type of output device—either in addition to or in lieu of a display screen 36—along with at least one input device—such as a microphone 70, a keypad, a keyboard, a mouse, or another type of input device—so as to assist the associated user in possession of said user device 26 to utilize the various functions provided by the system 20. Additionally, in at least one embodiment, the at least one user device 26 provides an at least one user transceiver 38 configured for selectively communicating with a corresponding authentication transceiver 40 of the at least one authentication device 28, as discussed further below. In at least one such embodiment, the user and authentication transceivers 38 and 40 may utilize near-field communication ("NFC"), or alternatively may utilize radio frequency identification ("RFID") or another radio frequency transmission. In still further embodiments, the user and authentication transceivers 38 and 40 may utilize any other wireless communication protocol, now known or later developed, such as Bluetooth, cellular, W-Fi or acoustic signals for example. As such, the present invention should not be read as being limited to use with any one particular type of user transceiver 38 and/or authentication transceiver 40, even though certain exemplary types of transceivers may be mentioned or shown herein for illustrative purposes. In still further embodiments, the user device 26 may comprise some or all of these various components in any and every possible combination, now known or later developed.

Figure 2:
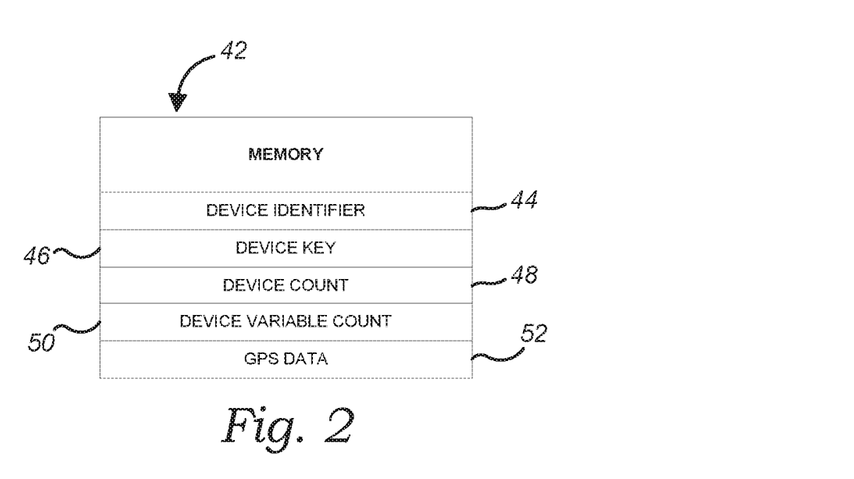
FIG. 2 is an architecture diagram of an exemplary memory data structure of an exemplary authentication device, in accordance with at least one embodiment.

As illustrated in the architecture diagram of FIG. 2 and discussed in greater detail below, in at least one embodiment, the at least one authentication device 28 provides a memory 42 containing at least one of a unique device identifier 44, a unique device key 46, and a device count 48 representing the number of times the authentication device 28 has been utilized to authenticate the corresponding product 22. In at least one further embodiment, the memory 42 further contains at least one of a device variable count 50 representing a value that increases each time the authentication device 28 is utilized to authenticate the corresponding product 22 (with the incrementation of the device variable count 50 based on an algorithm (i.e., a mathematical formula) that may be unique to the manufacturer of the product 22, or unique to the model of the product 22, or unique to the individual product 22 itself), GPS coordinates 52 associated with the product 22, and any other data pertinent to the product 22 itself or the environment in which the product 22 is located that could be used to help authenticate the product 22. It should be noted that, in at least one embodiment, the device count 48 and the device variable count 50 are one and the same. It should also be noted that the term "memory," as it relates to each of the at least one user device 26 and authentication device 28, is intended to include any type of electronic storage medium (or combination of storage mediums) now known or later developed, such as local hard drives, RAM, flash memory, secure digital ("SD") cards, external storage devices, network or cloud storage devices, integrated circuits, etc.

Figure 3:
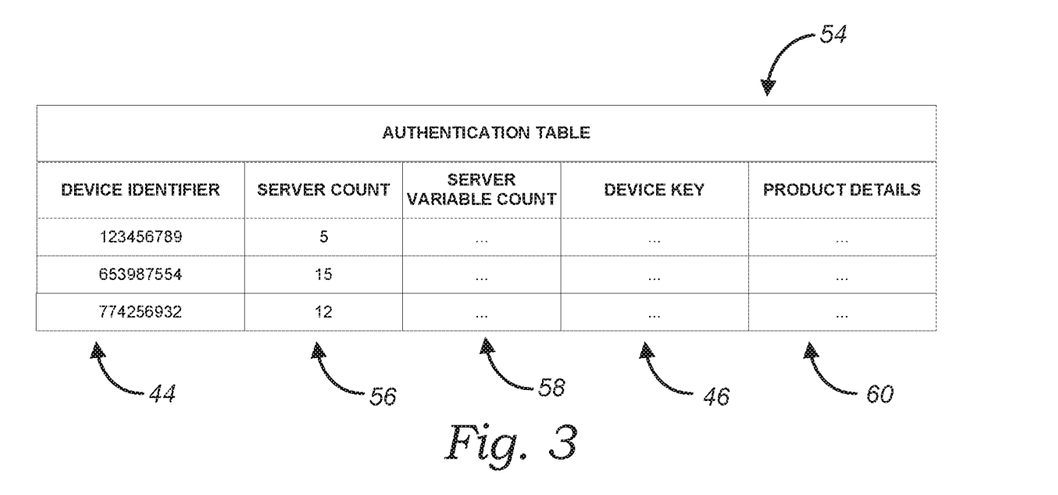
FIG. 3 is an architecture diagram of an exemplary authentication table, in accordance with at least one embodiment.

Additionally, in at least one embodiment, as illustrated in FIG. 3, the authentication server 24 provides an at least one authentication table 54 containing details related to the at least one authentication device 28, including at least one of the device identifier 44 currently associated with each of the at least one authentication device 28, a server count 56 representing the number of times the authentication server 24 has authenticated the product 22 associated with each of the at least one authentication device 28, a server variable count 58 corresponding to the device variable count 50 associated with each of the at least one authentication device 28 (i.e., incremented based on the same algorithm as the corresponding device variable count 50), a device key 46 currently associated with each of the at least one authentication device 28 (used to decrypt or otherwise authenticate data that has previously been prepared by each of the at least one authentication device 28, as discussed further below), and one or more product details 60 associated with the corresponding product 22 associated with each of the at least one authentication device 28—including but not limited to a product serial number, a brand name, a model name, a product photo, etc. It should be noted that while the term "table" is used herein to describe certain exemplary data structures, in at least one embodiment, any other suitable data type or data structure, or combinations thereof, now known or later developed, capable of storing the appropriate data, may be substituted. Thus, the present invention should not be read as being so limited.

As discussed in detail below, the system 20 may be utilized in a variety of contexts, where it is desirable to allow the at least one user to verify the authenticity of the at least one product 22. It should be noted that the below described applications of the system 20 are merely exemplary and are being provided herein for illustrative purposes. As such, the system 20 and associated methods described herein should not be read as being so limited, but instead can be utilized in any context, now known or later conceived, where there is a need for verifying the authenticity of the at least one product 22.

In at least one embodiment, upon a new product 22 being registered with the system 20 (i.e., to allow the at least one user to subsequently verify the authenticity of the product 22), the authentication server 24 first creates an entry in the authentication table 54 for the associated authentication device 28, including at least one of the device identifier 44 and device key 46 of the authentication device 28, along with any desired product details 60 related to the corresponding product 22, as mentioned above. Additionally, the server count 56 associated with the authentication device 28 is initialized to be zero, while the server variable count 58 is initialized based on the associated algorithm. In at least one embodiment, the authentication device 28 and its associated product 22 are then made available/accessible to the at least one user (such as a consumer, for example).

Figure 4:
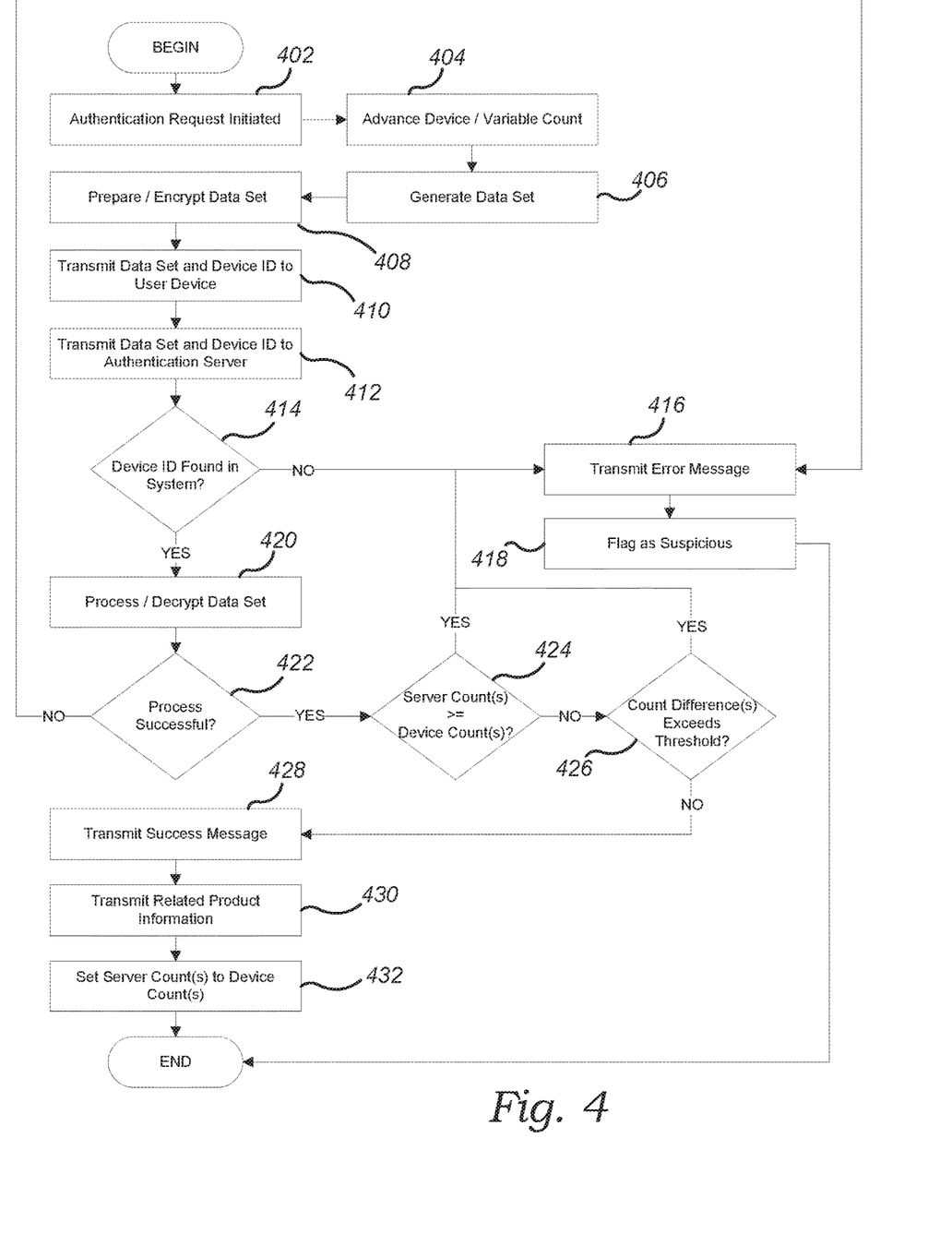
FIG. 4 is a flow diagram of an exemplary method for authenticating an at least one tangible product, in accordance with at least one embodiment.

In at least one embodiment, as illustrated in the flow diagram of FIG. 4, upon an associated user of the at least one user device 26 desiring to verify the authenticity of a given product 22, the user initiates an authentication request with the associated authentication device 28 (402). In at least one such embodiment, the authentication request is initiated by the user physically interacting with a switch, button or similar type of mechanical or electronic component (hereinafter referred to generally as a "switch" 30 for simplicity purposes) provided by the authentication device 28. In at least one alternate embodiment, the authentication request is initiated by the user application 32 residing either locally in memory 34 on the at least one user device 26 or remotely on the authentication server 24, through which the user application 32 transmits a signal via the user transceiver 38 to the authentication transceiver 40. In at least one embodiment, upon the authentication device 28 receiving the authentication request, the authentication device 28 powers on—in such embodiments, the authentication device 28 only powers on when authenticating the associated product 22, and remains powered down (or, alternatively, in a low power mode) at all other times so as to conserve power. In at least one still further embodiment, the authentication device 28 is selectively powered by the user device 26 via the user transceiver 38. In at least one embodiment, upon the authentication device 28 receiving the authentication request, the authentication device 28 increments the device count 48 by one (404). In at least one embodiment, where the authentication device 28 contains a device variable count 50 in memory 34, the authentication device 28 also increments the device variable count 50 based on the associated algorithm, as mentioned above. The authentication device 28 then generates a data set comprising at least one of the device identifier 44, the device count 48, the device key 46, the device variable count 50, the GPS coordinates 52, and any other pertinent data stored in memory 34 (406). Because the device count 48 and device variable count 50 (where applicable) change after each authentication request, the resulting data set is effectively a single-use, one-time code. In at least one further embodiment, the data set further includes a message authentication code ("MAC"), such as a hash-based MAC or cipher-based MAC, for example. In at least one embodiment, the authentication device 28 then encrypts the data set using the device key 46 (408). In at least one alternate embodiment, the authentication device 28 only encrypts a portion of the data set using the device key 46. In at least one further alternate embodiment, the authentication device 28 does not encrypt the data set. In at least one alternate embodiment, the MAC is kept separate from the data set, such that the encrypted or partially encrypted data set is used to generate the MAC. The data set and the device identifier 44 (along with the MAC, where applicable) are then made available to the user application 32 (410). In at least one embodiment, the device identifier 44 is encrypted using public key encryption prior to being made available to the user device 32. In at least one such embodiment, the data set and the device identifier 44 (along with the MAC, where applicable) are converted into a visual code—such as a QR code or barcode, for example—and displayed via a display screen 64 provided by the authentication device 28, such that the user application 32 may subsequently obtain the visual code via a camera 66 or other image capture device provided by the user device 26. In at least one alternate embodiment, the data set and the device identifier 44 (along with the MAC, where applicable) are converted into an acoustic signal (either audible or inaudible) and produced via a speaker 68 provided by the authentication device 28, such that the user application 32 may subsequently obtain the acoustic signal via a microphone 70 or other audio capture device provided by the user device 26. In at least one further alternate embodiment, the data set and the device identifier 44 (along with the MAC, where applicable) are converted into a digital signal and transmitted from the authentication transceiver 40 to the user transceiver 38. In at least one embodiment, the data set and the device identifier 44 (along with the MAC, where applicable) are only made available to the user application 32 for a limited period of time following receipt of the authentication request. In at least one alternate embodiment, rather than the authentication device 28 generating and transmitting the data set and the device identifier 44 (along with the MAC, where applicable) for a limited period of time upon receipt of an authentication request, the authentication device 28 instead continuously provides such data upon receipt of an authentication request, via one or more of the methods described above.

In at least one embodiment, upon the user application 32 receiving the data set and the device identifier 44 (along with the MAC, where applicable), the user application 32 transmits the data set and the device identifier 44 (along with the MAC, where applicable) to the authentication server 24 (412). In at least one embodiment, before processing the data set and the device identifier 44 (along with the MAC, where applicable), the authentication server 24 first determines whether the user device 26 has authorization to access the system 20. If the user device 26 does not have authorization to access the system 20, the authentication server 24 transmits an error message to the user application 32, informing the user of the access denial. In at least one such embodiment, the authentication server 24 directs the user to install an authorized version of the user application 32 or otherwise properly register with the system 20. Once the authentication server 24 determines that the user device 26 has authorization to access the system 20 (or, alternatively, where such access authorization is not required), the authentication server 24 accesses the authentication table 54 based on the transmitted device identifier 44. In embodiments where the transmitted device identifier 44 was encrypted by the authentication device 28 (as discussed above), the authentication server 24 first decrypts the device identifier 44. If the device identifier 44 is not found in the authentication table 54 (414), the authentication server 24 transmits an error message to the user application 32 (416)—indicating that the device identifier 44 does not exist in the system 20—which is then presented to the user via the display screen 36 of the user device 26 (or via audible cues, tactile cues, or any other form of feedback, now known or later developed in at least one further embodiment). Otherwise, if the device identifier 44 is found in the authentication table 54 (414), the authentication server 24 obtains the device key 46 associated with the device identifier 44, and uses the device key 46 to process the data set (420). In at least one such embodiment, processing the data set involves decrypting the data set (or at least any portions of the data set that have been encrypted) using the device key 46. In at least one alternate embodiment, where a MAC was transmitted, processing the data set involves using the device key 46 (or a different key, in at least one further embodiment) to authenticate the MAC. If processing of the data set is unsuccessful (422)—i.e., if the decrypted data set is an indecipherable sequence of bits or, alternatively, if the associated MAC cannot be authenticated—the authentication server 24 transmits an error message to the user application 32 (416)—indicating that the authentication of the associated product 22 has failed—which is then presented to the user via the display screen 36 of the user device 26 (or via audible cues, tactile cues, or any other form of feedback, now known or later developed in at least one further embodiment). In at least one further embodiment, if the processing of the data set is unsuccessful, the authentication server 24 further flags the device identifier 44 in the authentication table 54 as being suspicious (418), or alternatively locks the device identifier 44 temporarily or permanently. In at least one such embodiment, details associated with unsuccessful authentication attempts are stored by the authentication server 24 in an authentication attempts table, with said table containing select details including at least one of the device identifier 44 currently associated with each of the at least one authentication device 28 that has had an unsuccessful authentication attempt, the data set associated with each unsuccessful authentication attempt, and select details associated with user device 26 from which each unsuccessful authentication attempt originated. Based on these details, in at least one embodiment, the authentication server 24 is capable of determining whether a given authentication device 28, device identifier 44 and/or user device 26 should be flagged or locked as being suspicious. In at least one further embodiment, the authentication attempts table also stores details associated with successful authentication attempts. If the processing of the data set is successful (422), the authentication server 24 obtains the server count 56 associated with the device identifier 44 and compares the server count 56 against the device count 48. The server count 56 value represents the device count 48 value that was stored by the authentication server 24 after the last successful authentication of the associated product 22, prior to the current authentication attempt. As such, if the product 22 is authentic, then the associated device count 48 will be higher than the server count 56. In at least one alternate embodiment, if the processing of the data is successful (422), the authentication server 24 obtains the server variable count 58 associated with the device identifier 44 and compares the server variable count 58 against the device variable count 50. The server variable count 58 represents the device variable count 50 value that was stored by the authentication server 24 after the last successful authentication of the associated product 22, prior to the current authentication attempt. As such, if the product 22 is authentic, then the associated device variable count 50 will be one increment greater (based on the underlying algorithm used to increment each of the device variable count 50 and server variable count 58) than the server variable count 58. In at least one still further embodiment, the authentication server 24 utilizes both the server count 56 and the server variable count 58. If the authentication server 24 determines that the server count 56 is greater than or equal to the device count 48, or that the server variable count 58 is greater than or equal to the device variable count 50 (424), the authentication server 24 transmits an error message to the user application 32 (416)—indicating that the authentication of the associated product 22 has failed—which is then presented to the user via the display screen 36 of the user device 26 (or via audible cues, tactile cues, or any other form of feedback, now known or later developed in at least one further embodiment). In at least one further embodiment, if the authentication has failed, the authentication server 24 further flags the device identifier 44 in the authentication table 54 as being suspicious (418), or alternatively locks the device identifier 44 temporarily or permanently. Otherwise, if the authentication server 24 determines that the server count 56 is less than the device count 48, or that the server variable count 58 is less than the device variable count 50 (424), the authentication server 24 transmits an success message to the user application 32 (428)—indicating that the authentication of the associated product 22 has succeeded—which is then presented to the user via the display screen 36 of the user device 26 (or via audible cues, tactile cues, or any other form of feedback, now known or later developed in at least one further embodiment). Additionally, in at least one embodiment, the server count 56 value is set to be equal to the device count 48, and the server variable count 58 is set to be equal to the device variable count 50 (where applicable) (432). In at least one further embodiment, if the authentication server 24 determines that the device count 48 is greater than the server count 56, or that the server variable count 58 is less than the device variable count 50 (where applicable) (424), but further determines that the difference between the device count 48 and the server count 56, or between the server variable count 58 and the device variable count 50 (where applicable) exceeds a pre-defined threshold (426), the authentication server 24 transmits an error message to the user application 32 (416)—indicating that the authentication of the associated product 22 has failed or is otherwise questionable—which is then presented to the user via the display screen 36 of the user device 26 (or via audible cues, tactile cues, or any other form of feedback, now known or later developed in at least one further embodiment). In at least one further embodiment, if the authentication has failed, the authentication server 24 further flags the device identifier 44 in the authentication table 54 as being suspicious (418), or alternatively locks the device identifier 44 temporarily or permanently. In embodiments where the encrypted data includes a MAC, the MAC may be used by the authentication server 24 to verify the identity of the authentication device 28 and the integrity of the data set. In still further embodiments that utilize a MAC, the data set (including the MAC) and device identifier 44 may be unencrypted or partially encrypted when transmitted to the user application 32, and subsequently transmitted to the authentication server 24. In still further embodiments, select portions of the data set may be encrypted, while other portions of the data set remain unencrypted.

In at least one embodiment, in addition to the user application 32 receiving a "success" or "failure" notification related to the authentication of the product 22, the user application 32 may receive further details (430) including, but not limited to, one or more timestamps of previous successful, or unsuccessful, authentication attempts, GPS coordinates of previous successful, or unsuccessful, authentication attempts, data recorded during previous successful or unsuccessful authentication attempts, images of the product 22 being authenticated, details of the product's 22 purchase, and additional product details 60 or brand/manufacturer information. Accordingly, in at least one such embodiment, the user is able to visually compare the displayed information against the product 22 to which the authentication device 28 is attached—and if the information corresponds to the product 22, then the authenticity of the product 22 has been further verified.

Aspects of the present specification may also be described as the following embodiments:

1. A method for authenticating an at least one tangible product, the method comprising the steps of: implementing an authentication server configured for receiving and processing data related to the at least one product; implementing an at least one authentication device attached to each of the at least one product, the at least one authentication device configured for storing at least one of a unique device identifier, a unique device key, and a device variable count representing a value that increases each time said authentication device is utilized to authenticate the corresponding product, with the incrementation of the device variable count being based on an algorithm that is unique to at least one of the corresponding product, a manufacturer of the corresponding product, or a model of the corresponding product; maintaining an at least one authentication table in communication with the authentication server, the at least one authentication table containing the device identifier of each of the at least one rewritable memory device, a server variable count representing a value that increases each time the authentication server authenticates the product associated with each of the at least one authentication device, with the incrementation of the server variable count being based on the same algorithm used to increment the device variable count of the associated at least one authentication device, the device key currently associated with each of the at least one authentication device, and select details related to the corresponding at least one product; implementing a user application residing in memory on an at least one user device under the control of an at least one user, the at least one user device in selective communication with each of the authentication server and the at least one authentication device; and upon a one of the at least one user desiring to authenticate a one of the at least one product via the corresponding user device: initiating an authentication request with the associated authentication device; the authentication device incrementing the device variable count based on the underlying algorithm; the authentication device generating a data set comprising at least one of the device identifier, the device key, and the device variable count; the authentication device providing the data set and the device identifier to the user application; the user application transmitting the data set and the device identifier to the authentication server; the authentication server accessing the authentication table based on the transmitted device identifier; upon the authentication server determining that the transmitted device identifier does not match any of the at least one device identifier stored in the at least one authentication table, the authentication server transmitting an error message to the user application; upon the authentication server locating the transmitted device identifier in the at least one authentication table: the authentication server obtaining the device key associated with the transmitted device identifier; the authentication server attempting to process the data set using the device key; upon the authentication server determining that processing the data set was unsuccessful, the authentication server transmitting an error message to the user application; upon the authentication server determining that processing the data set was successful: the authentication server obtaining the server variable count associated with the transmitted device identifier; upon the authentication server determining that the device variable count is less than or equal to the server variable count, the authentication server transmitting an error message to the user application; upon the authentication server determining that the device variable count is greater than the server variable count: the authentication server transmitting a success message to the user application, indicating that the authentication of said product has succeeded; and the authentication server setting the server variable count to be equal to the device variable count.

2. The method according to embodiment 1, wherein the step of the authentication device providing the data set and the device identifier to the user application, further comprises the step of the authentication device encrypting at least a portion of the data set using the device key.

3. The method according to embodiments 1-2, wherein the step of the authentication server attempting to process the data set using the device key, further comprises the step of decrypting the encrypted portions of the data set using the device key.

4. The method according to embodiments 1-3, wherein the step of initiating an authentication request with the associated authentication device further comprises the step of interacting with a switch provided by the authentication device.

5. The method according to embodiments 1-4, wherein the step of initiating an authentication request with the associated authentication device further comprises the step of the user application transmitting a signal via a user transceiver provided by the user device, said signal subsequently being received by an authentication transceiver provided by the authentication device.

6. The method according to embodiments 1-5, further comprising the step of, upon the authentication device receiving the authentication request, the authentication device automatically powering on.

7. The method according to embodiments 1-6, further comprising the step of, upon the authentication device providing the encrypted data set and the device identifier to the user application, the authentication device automatically transitioning into one of a powered down state or low power state.

8. The method according to embodiments 1-7, wherein the step of the authentication device providing the data set and the device identifier to the user application further comprises the steps of: the authentication device converting the data set and the device identifier into a visual code; the authentication device displaying the visual code via a display screen provided by the authentication device; and the user application obtaining the visual code via an camera provided by the user device.

9. The method according to embodiments 1-8, wherein the step of the authentication device providing the data set and the device identifier to the user application further comprises the steps of: the authentication device converting the data set and the device identifier into an acoustic signal; the authentication device producing the acoustic signal using a speaker provided by the authentication device; and the user application obtaining the acoustic signal via a microphone provided by the user device.

10. The method according to embodiments 1-9, wherein the step of the authentication device providing the data set and the device identifier to the user application further comprises the steps of: the authentication device converting the data set and the device identifier into a digital signal; the authentication device transmitting the digital signal using an authentication transceiver provided by the authentication device; and the user application obtaining the digital signal via a user transceiver provided by the user device.

11. The method according to embodiments 1-10, wherein the step of determining that the device variable count is greater than the server variable count further comprises the step of, upon the authentication server determining that a difference between the device variable count and the server variable count exceeds a pre-defined threshold value, the authentication server transmitting an error message to the user application.

12. The method according to embodiments 1-11, wherein the step of the authentication server determining that the device variable count is greater than the server variable count, further comprises the step of the authentication server transmitting select details related to said product, as stored in the at least one authentication table, to the user application.

13. The method according to embodiments 1-12, wherein the step of the authentication device incrementing the device variable count based on the underlying algorithm further comprises the step of the authentication device incrementing the device variable count by one.

14. The method according to embodiments 1-13, wherein the step of the user application transmitting the data set and the device identifier to the authentication server, further comprises the step of, upon the authentication server determining that the user device does not have authorization to communicate with the authentication server, transmitting an error message to the user application.

15. A method for authenticating an at least one tangible product, the method comprising the steps of: implementing an authentication server configured for receiving and processing data related to the at least one product; implementing an at least one authentication device attached to each of the at least one product, the at least one authentication device configured for storing at least one of a unique device identifier, a unique device key, and a device variable count representing a value that increases each time said authentication device is utilized to authenticate the corresponding product, with the incrementation of the device variable count being based on an algorithm that is unique to at least one of the corresponding product, a manufacturer of the corresponding product, or a model of the corresponding product; maintaining an at least one authentication table in communication with the authentication server, the at least one authentication table containing the device identifier of each of the at least one rewritable memory device, a server variable count representing a value that increases each time the authentication server authenticates the product associated with each of the at least one authentication device, with the incrementation of the server variable count being based on the same algorithm used to increment the device variable count of the associated at least one authentication device, the device key currently associated with each of the at least one authentication device, and select details related to the corresponding at least one product; implementing a user application residing in memory on an at least one user device under the control of an at least one user, the at least one user device in selective communication with each of the authentication server and the at least one authentication device; and upon a one of the at least one user desiring to authenticate a one of the at least one product via the corresponding user device: initiating an authentication request with the associated authentication device; the authentication device incrementing the device variable count based on the underlying algorithm; the authentication device generating a data set comprising at least one of the device identifier, the device key, and the device variable count; the authentication device providing the data set and the device identifier to the user application; the user application transmitting the data set and the device identifier to the authentication server; the authentication server accessing the authentication table based on the transmitted device identifier; upon the authentication server determining that the transmitted device identifier does not match any of the at least one device identifier stored in the at least one authentication table, the authentication server transmitting an error message to the user application; upon the authentication server locating the transmitted device identifier in the at least one authentication table: the authentication server obtaining the device key associated with the transmitted device identifier; the authentication server attempting to process the data set using the device key; upon the authentication server determining that processing the data set was unsuccessful, the authentication server transmitting an error message to the user application; upon the authentication server determining that processing the data set was successful: the authentication server obtaining the server variable count associated with the transmitted device identifier; upon the authentication server determining that the device variable count is less than or equal to the server variable count, the authentication server transmitting an error message to the user application; upon the authentication server determining that the device variable count is greater than the server variable count: upon the authentication server determining that a difference between the device variable count and the server variable count exceeds a pre-defined threshold value, the authentication server transmitting an error message to the user application; and upon the authentication server determining that a difference between the device variable count and the server variable count does not exceed a pre-defined threshold value: the authentication server transmitting a success message to the user application, indicating that the authentication of said product has succeeded; and the authentication server setting the server count to be equal to the device count.

16. A product authentication system for authenticating an at least one tangible product, the system comprising: an authentication server configured for receiving and processing data related to the at least one product; an at least one authentication device attached to each of the at least one product, the at least one authentication device configured for storing at least one of a unique device identifier, a unique device key, and a device variable count representing a value that increases each time said authentication device is utilized to authenticate the corresponding product, with the incrementation of the device variable count being based on an algorithm that is unique to at least one of the corresponding product, a manufacturer of the corresponding product, or a model of the corresponding product; an at least one authentication table in communication with the authentication server, the at least one authentication table containing the device identifier of each of the at least one rewritable memory device, a server variable count representing a value that increases each time the authentication server authenticates the product associated with each of the at least one authentication device, with the incrementation of the server variable count being based on the same algorithm used to increment the device variable count of the associated at least one authentication device, the device key currently associated with each of the at least one authentication device, and select details related to the corresponding at least one product; and an at least one user device under the control of an at least one user and in selective communication with each of the authentication server and the at least one authentication device, the at least one user device providing a user application residing in memory thereon; wherein, upon a one of the at least one user desiring to authenticate a one of the at least one product via the corresponding user device, the system is configured for: receiving, via the associated authentication device, an authentication request; incrementing, via the authentication device, the device variable count based on the underlying algorithm; generating, via the authentication device, a data set comprising at least one of the device identifier, the device key, and the device variable count; providing, via the authentication device, the data set and the device identifier to the user application;

transmitting, via the user application, the data set and the device identifier to the authentication server; accessing, via the authentication server, the authentication table based on the transmitted device identifier; upon the authentication server determining that the transmitted device identifier does not match any of the at least one device identifier stored in the at least one authentication table, transmitting, via the authentication server, an error message to the user application; upon the authentication server locating the transmitted device identifier in the at least one authentication table: obtaining, via the authentication server, the device key associated with the transmitted device identifier; attempting, via the authentication server, to process the data set using the device key; upon the authentication server determining that processing the data set was unsuccessful, transmitting, via the authentication server, an error message to the user application; upon the authentication server determining that processing the data set was successful: obtaining, via the authentication server, the server variable count associated with the transmitted device identifier; upon the authentication server determining that the device variable count is less than or equal to the server variable count, transmitting, via the authentication server, an error message to the user application; upon the authentication server determining that the device variable count is greater than the server variable count: transmitting, via the authentication server, a success message to the user application, indicating that the authentication of said product has succeeded; and setting, via the authentication server, the server variable count to be equal to the device variable count.

17. The product authentication system according to embodiment 16, wherein while providing, via the authentication device, the data set and the device identifier to the user application, the system is further configured for encrypting, via the authentication device, at least a portion of the data set using the device key.

18. The product authentication system according to embodiments 16-17, wherein while attempting to process the data set, via the authentication server, using the device key, the system is further configured for decrypting the encrypted portions of the data set, via the authentication server, using the device key.

19. The product authentication system according to embodiments 16-18, wherein the authentication device provides a switch configured for being selectively triggered to initiate the authentication request.

20. The product authentication system according to embodiments 16-19, wherein: the at least one user device provides a user transceiver; and the at least one authentication device provides an authentication transceiver; wherein, the user application of said user device is configured for transmitting a signal via the user transceiver when initiating an authentication request, said signal subsequently being received by the authentication transceiver.

21. The product authentication system according to embodiments 16-20, wherein the authentication device is configured for automatically powering on upon receiving the authorization request.

22. The product authentication system according to embodiments 16-21, wherein the authentication device is configured for automatically transitioning into one of a powered down state or low power state upon providing the data set and the device identifier to the user application.

23. The product authentication system according to embodiments 16-22, wherein while providing, via the authentication device, the data set and the device identifier to the user application, the system is further configured for: converting, via the authentication device, the data set and the device identifier into a visual code; displaying, via the authentication device, the visual code via a display screen provided by the authentication device; and obtaining, via the user application, the visual code via an camera provided by the user device.

24. The product authentication system according to embodiments 16-23, wherein while providing, via the authentication device, the data set and the device identifier to the user application, the system is further configured for: converting, via the authentication device, the data set and the device identifier into an acoustic signal; producing, via the authentication device, the acoustic signal using a speaker provided by the authentication device; and obtaining, via the user application, the acoustic signal via a microphone provided by the user device.

25. The product authentication system according to embodiments 16-24, wherein while providing, via the authentication device, the data set and the device identifier to the user application, the system is further configured for: converting, via the authentication device, the data set and the device identifier into a digital signal; transmitting, via the authentication device, the digital signal using an authentication transceiver provided by the authentication device; and obtaining, via the user application, the digital signal via a user transceiver provided by the user device.

26. The product authentication system according to embodiments 16-25, wherein while determining that the device variable count is greater than the server variable count, the system is further configured for transmitting, via the authentication server, an error message to the user application upon the authentication server determining that a difference between the device variable count and the server variable count exceeds a pre-defined threshold value.

27. The product authentication system according to embodiments 16-26, wherein while determining, via the authentication server, that the device variable count is greater than the server variable count, the system is further configured for transmitting, via the authentication server, select details related to said product, as stored in the at least one authentication table, to the user application.

28. The product authentication system according to embodiments 16-27, wherein while incrementing, via the authentication device, the device variable count based on the underlying algorithm, the system is further configured for incrementing, via the authentication device, the device count by one.

29. The product authentication system according to embodiments 16-28, wherein while transmitting, via the user application, the data set and the device identifier to the authentication server, the system is further configured for transmitting, via the authentication server, an error message to the user application upon the authentication server determining that the user device does not have authorization to communicate with the authentication server.

In closing, regarding the exemplary embodiments of the present invention as shown and described herein, it will be appreciated a product authentication system and associated methods are disclosed and configured for authenticating an at least one tangible product via an authentication device attached to said product. Because the principles of the invention may be practiced in a number of configurations beyond those shown and described, it is to be understood that the invention is not in any way limited by the exemplary embodiments, but is generally directed to a product authentication system and is able to take numerous forms to do so without departing from the spirit and scope of the invention.

It will also be appreciated by those skilled in the art that the present invention is not limited to the particular geometries and materials of construction disclosed, but may instead entail other functionally comparable structures or materials, now known or later developed, without departing from the spirit and scope of the invention.

Certain embodiments of the present invention are described herein, including the best mode known to the inventor(s) for carrying out the invention. Of course, variations on these described embodiments will become apparent to those of ordinary skill in the art upon reading the foregoing description. The inventor(s) expect skilled artisans to employ such variations as appropriate, and the inventor(s) intend for the present invention to be practiced otherwise than specifically described herein. Accordingly, this invention includes all modifications and equivalents of the subject matter recited in the claims appended hereto as permitted by applicable law. Moreover, any combination of the above-described embodiments in all possible variations thereof is encompassed by the invention unless otherwise indicated herein or otherwise clearly contradicted by context.

Groupings of alternative embodiments, elements, or steps of the present invention are not to be construed as limitations. Each group member may be referred to and claimed individually or in any combination with other group members disclosed herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Unless otherwise indicated, all numbers expressing a characteristic, item, quantity, parameter, property, term, and so forth used in the present specification and claims are to be understood as being modified in all instances by the term "about." As used herein, the term "about" means that the characteristic, item, quantity, parameter, property, or term so qualified encompasses a range of plus or minus ten percent above and below the value of the stated characteristic, item, quantity, parameter, property, or term. Accordingly, unless indicated to the contrary, the numerical parameters set forth in the specification and attached claims are approximations that may vary. At the very least, and not as an attempt to limit the application of the doctrine of equivalents to the scope of the claims, each numerical indication should at least be construed in light of the number of reported significant digits and by applying ordinary rounding techniques. Notwithstanding that the numerical ranges and values setting forth the broad scope of the invention are approximations, the numerical ranges and values set forth in the specific examples are reported as precisely as possible. Any numerical range or value, however, inherently contains certain errors necessarily resulting from the standard deviation found in their respective testing measurements. Recitation of numerical ranges of values herein is merely intended to serve as a shorthand method of referring individually to each separate numerical value falling within the range. Unless otherwise indicated herein, each individual value of a numerical range is incorporated into the present specification as if it were individually recited herein. Similarly, as used herein, unless indicated to the contrary, the term "substantially" is a term of degree intended to indicate an approximation of the characteristic, item, quantity, parameter, property, or term so qualified, encompassing a range that can be understood and construed by those of ordinary skill in the art.

Use of the terms "may" or "can" in reference to an embodiment or aspect of an embodiment also carries with it the alternative meaning of "may not" or "cannot." As such, if the present specification discloses that an embodiment or an aspect of an embodiment may be or can be included as part of the inventive subject matter, then the negative limitation or exclusionary proviso is also explicitly meant, meaning that an embodiment or an aspect of an embodiment may not be or cannot be included as part of the inventive subject matter. In a similar manner, use of the term "optionally" in reference to an embodiment or aspect of an embodiment means that such embodiment or aspect of the embodiment may be included as part of the inventive subject matter or may not be included as part of the inventive subject matter. Whether such a negative limitation or exclusionary proviso applies will be based on whether the negative limitation or exclusionary proviso is recited in the claimed subject matter.

The terms "a," "an," "the" and similar references used in the context of describing the present invention (especially in the context of the following claims) are to be construed to cover both the singular and the plural, unless otherwise indicated herein or clearly contradicted by context. Further, ordinal indicators—such as "first," "second," "third," etc.—for identified elements are used to distinguish between the elements, and do not indicate or imply a required or limited number of such elements, and do not indicate a particular position or order of such elements unless otherwise specifically stated. All methods described herein can be performed in any suitable order unless otherwise indicated herein or otherwise clearly contradicted by context. The use of any and all examples, or exemplary language (e.g., "such as") provided herein is intended merely to better illuminate the present invention and does not pose a limitation on the scope of the invention otherwise claimed. No language in the present specification should be construed as indicating any non-claimed element essential to the practice of the invention.

When used in the claims, whether as filed or added per amendment, the open-ended transitional term "comprising" (along with equivalent open-ended transitional phrases thereof such as "including," "containing" and "having") encompasses all the expressly recited elements, limitations, steps and/or features alone or in combination with un-recited subject matter; the named elements, limitations and/or features are essential, but other unnamed elements, limitations and/or features may be added and still form a construct within the scope of the claim. Specific embodiments disclosed herein may be further limited in the claims using the closed-ended transitional phrases "consisting of" or "consisting essentially of" in lieu of or as an amendment for "comprising." When used in the claims, whether as filed or added per amendment, the closed-ended transitional phrase "consisting of" excludes any element, limitation, step, or feature not expressly recited in the claims. The closed-ended transitional phrase "consisting essentially of" limits the scope of a claim to the expressly recited elements, limitations, steps and/or features and any other elements, limitations, steps and/or features that do not materially affect the basic and novel characteristic(s) of the claimed subject matter. Thus, the meaning of the open-ended transitional phrase "comprising" is being defined as encompassing all the specifically recited elements, limitations, steps and/or features as well as any optional, additional unspecified ones.

The meaning of the closed-ended transitional phrase "consisting of" is being defined as only including those elements, limitations, steps and/or features specifically recited in the claim, whereas the meaning of the closed-ended transitional phrase "consisting essentially of" is being defined as only including those elements, limitations, steps and/or features specifically recited in the claim and those elements, limitations, steps and/or features that do not materially affect the basic and novel characteristic(s) of the claimed subject matter. Therefore, the open-ended transitional phrase "comprising" (along with equivalent open-ended transitional phrases thereof) includes within its meaning, as a limiting case, claimed subject matter specified by the closed-ended transitional phrases "consisting of" or "consisting essentially of." As such, embodiments described herein or so claimed with the phrase "comprising" are expressly or inherently unambiguously described, enabled and supported herein for the phrases "consisting essentially of" and "consisting of."

Any claims intended to be treated under 35 U.S.C. § 112(f) will begin with the words "means for," but use of the term "for" in any other context is not intended to invoke treatment under 35 U.S.C. § 112(f). Accordingly, Applicant reserves the right to pursue additional claims after filing this application, in either this application or in a continuing application.

It should be understood that the logic code, programs, modules, processes, methods, and the order in which the respective elements of each method are performed are purely exemplary. Depending on the implementation, they may be performed in any order or in parallel, unless indicated otherwise in the present disclosure. Further, the logic code is not related, or limited to any particular programming language, and may comprise one or more modules that execute on one or more processors in a distributed, non-distributed, or multiprocessing environment. Additionally, the various illustrative logical blocks, modules, methods, and algorithm processes and sequences described in connection with the embodiments disclosed herein can be implemented as electronic hardware, computer software, or combinations of both. To clearly illustrate this interchangeability of hardware and software, various illustrative components, blocks, modules, and process actions have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of this document.

The phrase "non-transitory," in addition to having its ordinary meaning, as used in this document means "enduring or long-lived". The phrase "non-transitory computer readable medium," in addition to having its ordinary meaning, includes any and all computer readable mediums, with the sole exception of a transitory, propagating signal. This includes, by way of example and not limitation, non-transitory computer-readable mediums such as register memory, processor cache and random-access memory ("RAM").

The methods as described above may be used in the fabrication of integrated circuit chips. The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher level carrier) or in a multi-chip package (such as a ceramic carrier that has either or both surface interconnections or buried interconnections). In any case, the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

All patents, patent publications, and other publications referenced and identified in the present specification are individually and expressly incorporated herein by reference in their entirety for the purpose of describing and disclosing, for example, the compositions and methodologies described in such publications that might be used in connection with the present invention. These publications are provided solely for their disclosure prior to the filing date of the present application. Nothing in this regard should be construed as an admission that the inventors are not entitled to antedate such disclosure by virtue of prior invention or for any other reason. All statements as to the date or representation as to the contents of these documents is based on the information available to the applicants and does not constitute any admission as to the correctness of the dates or contents of these documents.

While aspects of the invention have been described with reference to at least one exemplary embodiment, it is to be clearly understood by those skilled in the art that the invention is not limited thereto. Rather, the scope of the invention is to be interpreted only in conjunction with the appended claims and it is made clear, here, that the inventor(s) believe that the claimed subject matter is the invention.

What is claimed is:

1. A method for authenticating tangible products, the method comprising the steps of:
   implementing an authentication server configured for receiving and processing data related to the tangible products;
   initiating a plurality of authentication devices, each of the authentication devices attached to a one of the tangible products, each of the authentication devices configured for storing at least one of a unique device identifier, a unique device key, an algorithm that is unique to at least one of the corresponding tangible product to which said authentication device is attached, a manufacturer of the corresponding tangible product to which said authentication device is attached, or a model of the corresponding tangible product to which said authentication device is attached, as compared to other tangible products, manufacturers of said other tangible products, or models of said other tangible products to which other ones of the authentication devices are attached, and a device variable count representing a value that increases each time said authentication device is utilized to authenticate the corresponding tangible product to which said authentication device is attached, with an incrementation of the device variable count being based on the algorithm associated with said authentication device, each of the unique device identifier, unique device key, and unique algorithm associated with each of the authentication devices being set by the authentication server upon each said authentication device being initiated;

maintaining an at least one authentication table in communication with the authentication server, the at least one authentication table containing, for each of the authentication devices, the device identifier of said authentication device, a server variable count representing a value that increases each time the authentication server authenticates the tangible product to which said authentication device is attached, with an incrementation of the server variable count being based on the same algorithm used to advance the device variable count of said authentication device, the device key currently associated with said authentication device, and select product identifying details related to the corresponding tangible product to which said authentication device is attached, said product identifying details comprising at least one of a unique product serial number, a brand name, a model name, and a product photo;

implementing a user application residing in memory on an at least one user device under the control of an at least one user, the at least one user device in selective communication with each of the authentication server and the at least one authentication device; and upon an attempt to authenticate a one of the tangible products via a one of the at least one user device:

initiating an authentication request with the associated authentication device;

the authentication device advancing the device variable count based on the algorithm associated with the authentication device;

the authentication device generating a data set comprising the device variable count;

the authentication device providing the data set and the device identifier to the user application corresponding to said one of the at least one user device;

the user application transmitting the data set and the device identifier to the authentication server;

the authentication server accessing the authentication table based on the transmitted device identifier;

upon the authentication server determining that the transmitted device identifier does not match any of the device identifiers stored in the at least one authentication table, the authentication server transmitting an error message to the user application;

upon the authentication server locating the transmitted device identifier in the at least one authentication table:

the authentication server obtaining the device key associated with the transmitted device identifier;

the authentication server attempting to process the data set using the device key;

upon the authentication server determining that processing the data set was unsuccessful, the authentication server transmitting an error message to the user application;

upon the authentication server determining that processing the data set was successful:

the authentication server obtaining the server variable count associated with the transmitted device identifier;

upon the authentication server determining that the device variable count is less than or equal to the server variable count, the authentication server transmitting an error message to the user application;

upon the authentication server determining that the device variable count is greater than the server variable count:

the authentication server transmitting a success message to the user application; and                 the authentication server setting the server variable count to be equal to the device variable count;

whereby, during said attempt to authenticate said tangible product via said user device, no data is transmitted or written to the associated authentication device by either said user device or the authentication server.

2. The method of claim 1, wherein the step of the authentication device providing the data set and the device identifier to the user application, further comprises a step of the authentication device encrypting an at least one portion of the data set using the device key.

3. The method of claim 2, wherein the step of the authentication server attempting to process the data set using the device key, further comprises a step of decrypting the at least one portion of the data set that was encrypted using the device key.

4. The method of claim 1, wherein the step of initiating an authentication request with the associated authentication device further comprises a step of the user application transmitting a signal via a user transceiver provided by the user device, said signal subsequently being received by an authentication transceiver provided by the authentication device.

5. The method of claim 1, wherein the step of the authentication device providing the data set and the device identifier to the user application further comprises steps of:

the authentication device converting the data set and the device identifier into a visual code;

the authentication device displaying the visual code via a display screen provided by the authentication device; and     the user application obtaining the visual code via a camera provided by the user device.

6. The method of claim 1, wherein the step of the authentication device providing the data set and the device identifier to the user application further comprises steps of:

the authentication device converting the data set and the device identifier into an acoustic signal;

the authentication device producing the acoustic signal using a speaker provided by the authentication device; and     the user application obtaining the acoustic signal via a microphone provided by the user device.

7. The method of claim 1, wherein the step of the authentication device providing the data set and the device identifier to the user application further comprises steps of:

the authentication device converting the data set and the device identifier into a digital signal;

the authentication device transmitting the digital signal using an authentication transceiver provided by the authentication device; and     the user application obtaining the digital signal via a user transceiver provided by the user device.

8. The method of claim 1, wherein the step of determining that the device variable count is greater than the server variable count further comprises a step of, upon the authentication server determining that a difference between the device variable count and the server variable count exceeds a pre-defined threshold value, the authentication server transmitting an error message to the user application.

9. The method of claim 1, wherein the step of the authentication device advancing the device variable count based on the algorithm associated with the authentication device further comprises a step of the authentication device incrementing the device variable count by at least one.

10. A product authentication system for authenticating tangible products, the system comprising:
an authentication server configured for receiving and processing data related to the tangible products;
a plurality of authentication devices, each of the authentication devices attached to a one of the tangible products, each of the authentication devices configured for storing at least one of a unique device identifier, a unique device key, an algorithm that is unique to at least one of the corresponding tangible product to which said authentication device is attached, a manufacturer of the corresponding tangible product to which said authentication device is attached, or a model of the corresponding tangible product to which said authentication device is attached, as compared to other tangible products, manufacturers of said other tangible products, or models of said other tangible products to which other ones of the authentication devices are attached, and a device variable count representing a value that increases each time said authentication device is utilized to authenticate the corresponding tangible product to which said authentication device is attached, with an incrementation of the device variable count being based on the algorithm associated with said authentication device, each of the unique device identifier, unique device key, and unique algorithm associated with each of the authentication devices being set by the authentication server upon each said authentication device being initiated;
an at least one authentication table in communication with the authentication server, the at least one authentication table containing, for each of the authentication devices, the device identifier of said authentication device, a server variable count representing a value that increases each time the authentication server authenticates the tangible product to which said authentication device is attached, with an incrementation of the server variable count being based on the same algorithm used to advance the device variable count of said authentication device, the device key currently associated with said authentication device, and select product identifying details related to the corresponding tangible product to which said authentication device is attached, said product identifying details comprising at least one of a unique product serial number, a brand name, a model name, and a product photo; and
an at least one user device under the control of an at least one user and in selective communication with each of the authentication server and the at least one authentication device, the at least one user device providing a user application residing in memory thereon;
wherein, upon an attempt to authenticate a one of the tangible via a one of the at least one user device, the system is configured for:
receiving, via the authentication device attached to said tangible product, an authentication request;
advancing, via said authentication device, the device variable count based on the algorithm associated with said authentication device;
generating, via said authentication device, a data set comprising the device variable count;
providing, via said authentication device, the data set and the device identifier to the user application corresponding to said one of the at least one user device;
transmitting, via the user application, the data set and the device identifier to the authentication server;
accessing, via the authentication server, the authentication table based on the transmitted device identifier;
upon the authentication server determining that the transmitted device identifier does not match any of the device identifiers stored in the at least one authentication table, transmitting, via the authentication server, an error message to the user application;
upon the authentication server locating the transmitted device identifier in the at least one authentication table:
obtaining, via the authentication server, the device key associated with the transmitted device identifier;
attempting, via the authentication server, to process the data set using the device key;
upon the authentication server determining that processing the data set was unsuccessful, transmitting, via the authentication server, an error message to the user application;
upon the authentication server determining that processing the data set was successful:
obtaining, via the authentication server, the server variable count associated with the transmitted device identifier;
upon the authentication server determining that the device variable count is less than or equal to the server variable count, transmitting, via the authentication server, an error message to the user application;
upon the authentication server determining that the device variable count is greater than the server variable count:
transmitting, via the authentication server, a success message to the user application; and
setting, via the authentication server, the server variable count to be equal to the device variable count;
whereby, during said attempt to authenticate said tangible product via said user device, no data is transmitted or written to the authentication device attached to said tangible product by either said user device or the authentication server.

11. The product authentication system of claim 10, wherein while providing, via the authentication device, the data set and the device identifier to the user application, the system is further configured for encrypting, via the authentication device, an at least one portion of the data set using the device key.

12. The product authentication system of claim 11, wherein while attempting to process the data set, via the authentication server, using the device key, the system is further configured for decrypting the at least one portion of the data set that was encrypted using the device key, via the authentication server.

13. The product authentication system of claim 10, wherein the authentication device provides a switch configured for being selectively triggered to initiate the authentication request.

14. The product authentication system of claim 10, wherein:
- the at least one user device provides a user transceiver; and
- each of the authentication devices provides an authentication transceiver;
- wherein, the user application of said user device is configured for transmitting a signal via the user transceiver when initiating an authentication request, said signal subsequently being received by the authentication transceiver.

15. The product authentication system of claim 10, wherein while providing, via the authentication device, the data set and the device identifier to the user application, the system is further configured for:
- converting, via the authentication device, the data set and the device identifier into a visual code;
- displaying, via the authentication device, the visual code via a display screen provided by the authentication device; and
- obtaining, via the user application, the visual code via a camera provided by the user device.

16. The product authentication system of claim 10, wherein while providing, via the authentication device, the data set and the device identifier to the user application, the system is further configured for:
- converting, via the authentication device, the data set and the device identifier into an acoustic signal;
- producing, via the authentication device, the acoustic signal using a speaker provided by the authentication device; and
- obtaining, via the user application, the acoustic signal via a microphone provided by the user device.

17. The product authentication system of claim 10, wherein while providing, via the authentication device, the data set and the device identifier to the user application, the system is further configured for:
- converting, via the authentication device, the data set and the device identifier into a digital signal;
- transmitting, via the authentication device, the digital signal using an authentication transceiver provided by the authentication device; and
- obtaining, via the user application, the digital signal via a user transceiver provided by the user device.

18. The product authentication system of claim 10, wherein while determining that the device variable count is greater than the server variable count, the system is further configured for transmitting, via the authentication server, an error message to the user application upon the authentication server determining that a difference between the device variable count and the server variable count exceeds a pre-defined threshold value.

19. The product authentication system of claim 10, wherein while advancing, via the authentication device, the device variable count based on the algorithm associated with the authentication device, the system is further configured for incrementing, via the authentication device, the device count by at least one.

* * * * *